United States Patent [19]

Heath

[11] Patent Number: 5,205,574
[45] Date of Patent: Apr. 27, 1993

[54] TOW HITCH APPARATUS

[76] Inventor: John A. Heath, State Rd., Phillipston, Mass. 01331

[21] Appl. No.: 740,129

[22] Filed: Aug. 5, 1991

[51] Int. Cl.$^5$ ............................................. B60D 1/06
[52] U.S. Cl. ..................... 280/495; 280/511; 184/38.1; 184/38.4; 410/3
[58] Field of Search ............. 280/495, 500, 501, 502, 280/505, 511, 491.5; 184/83, 37, 38.1, 38.2, 38.3, 38.4, 108; 410/3

[56] References Cited

U.S. PATENT DOCUMENTS

| | | | |
|---|---|---|---|
| 806,198 | 12/1905 | Schulz | 184/38.1 |
| 960,341 | 6/1910 | Kincaid | 184/108 |
| 2,506,090 | 5/1950 | Lee | 280/502 |
| 2,917,323 | 12/1959 | Mandekic | 280/502 |
| 3,857,575 | 12/1974 | Lee | 280/1 |
| 4,605,353 | 8/1986 | Hahn et al. | 414/401 |
| 4,756,172 | 7/1988 | Weaver | 70/234 |
| 4,832,360 | 5/1989 | Christian | 280/511 |
| 4,889,357 | 12/1989 | Perry | 280/475 |

FOREIGN PATENT DOCUMENTS 2416807 10/1979 France .................. 280/502

Primary Examiner—Margaret A. Focarino
Assistant Examiner—A. M. Boehler
Attorney, Agent, or Firm—Leon Gilden

[57] ABSTRACT

A hitch structure is arranged for securement in a stable relationship of a trailer in mounting the trailer and associated cargo to a horizontal support post to impart stability to the trailer organization during transport thereof.

4 Claims, 5 Drawing Sheets

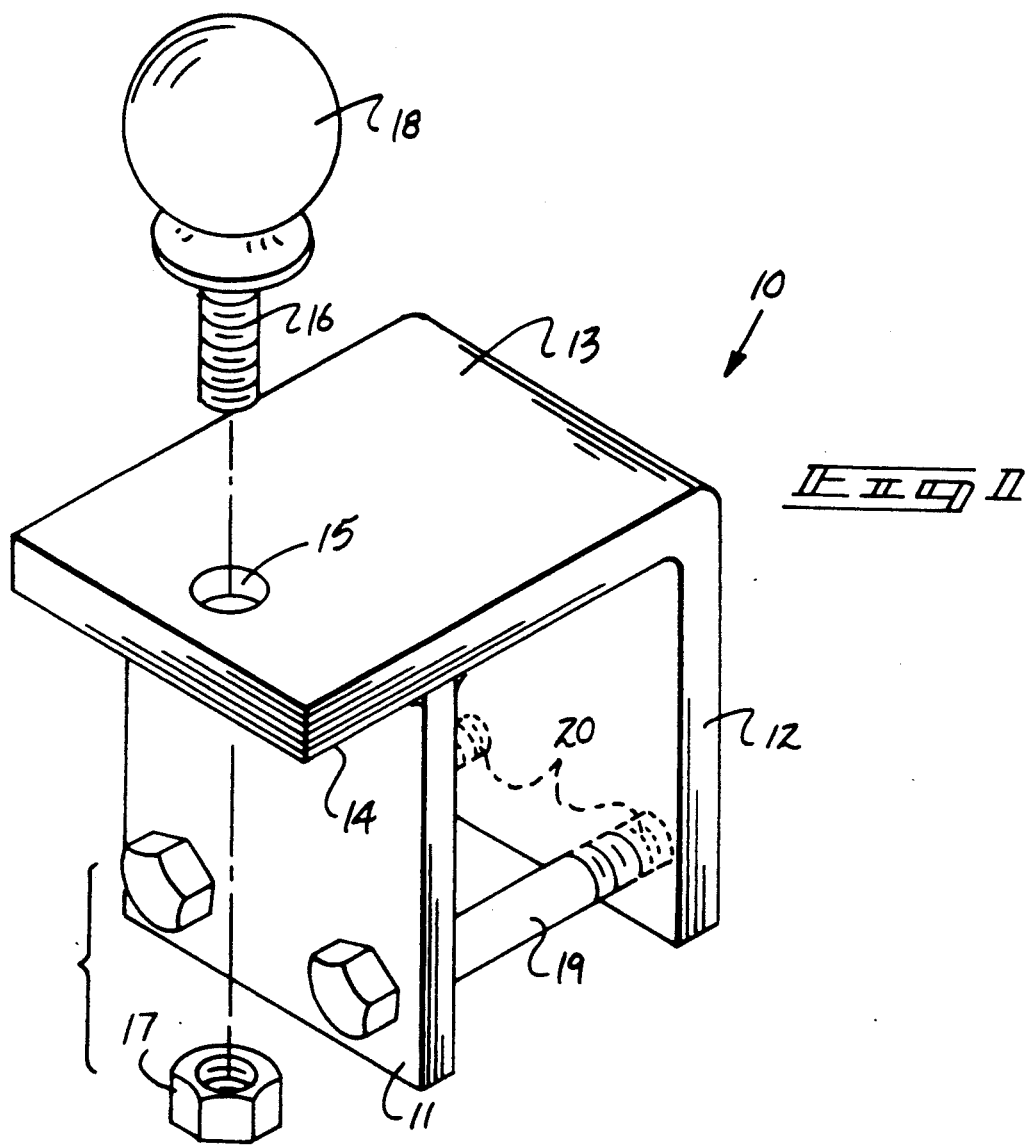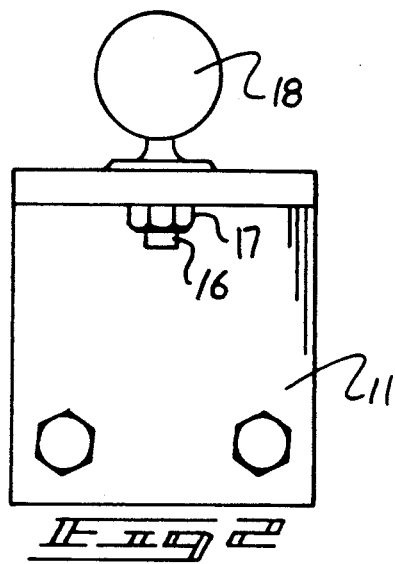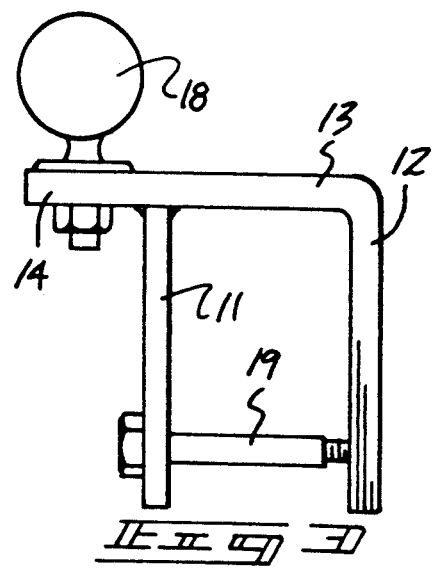

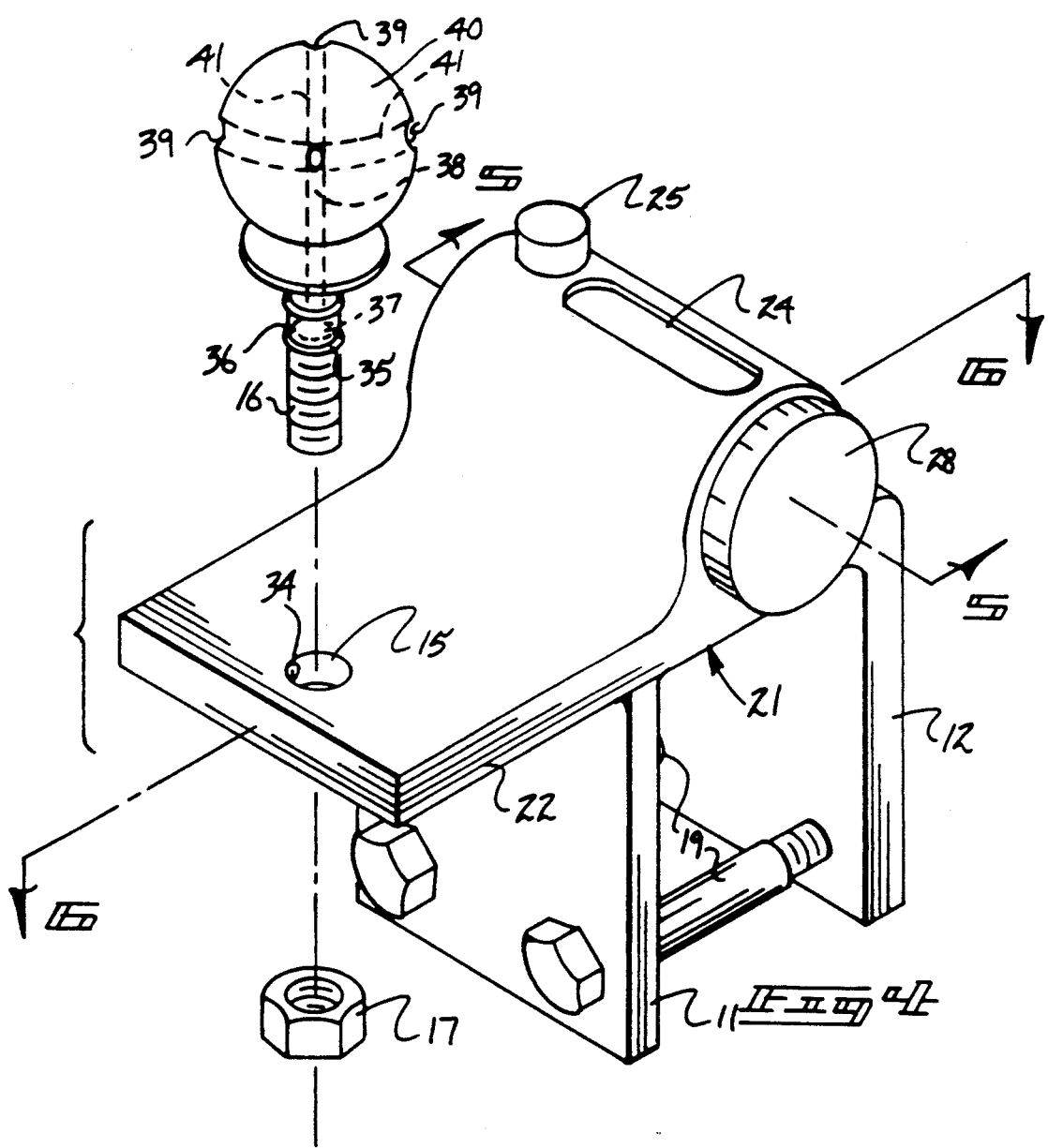
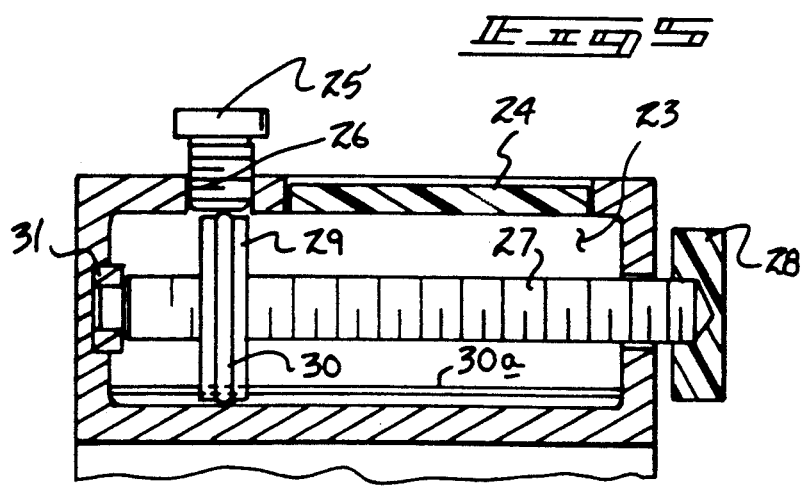

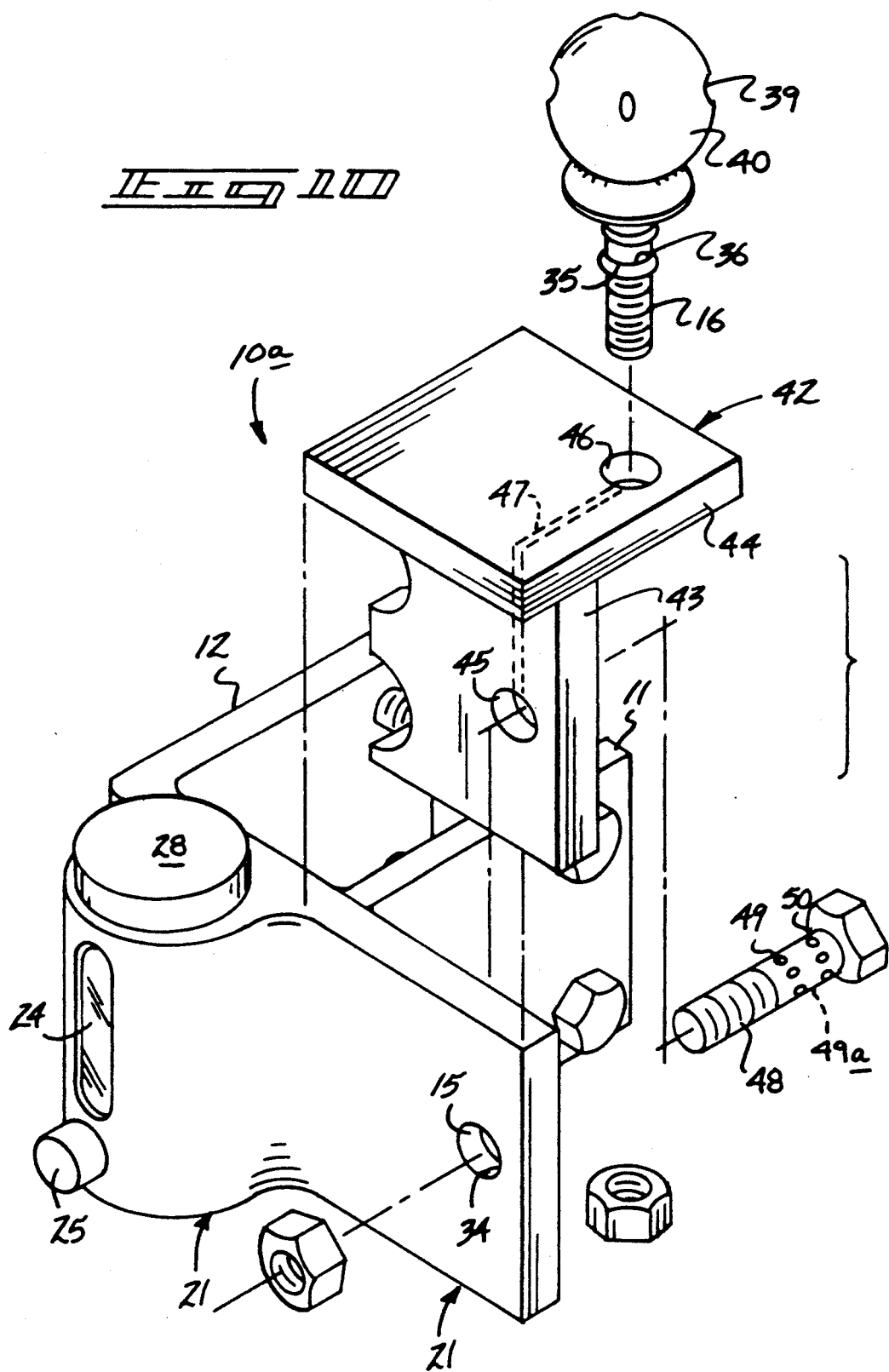

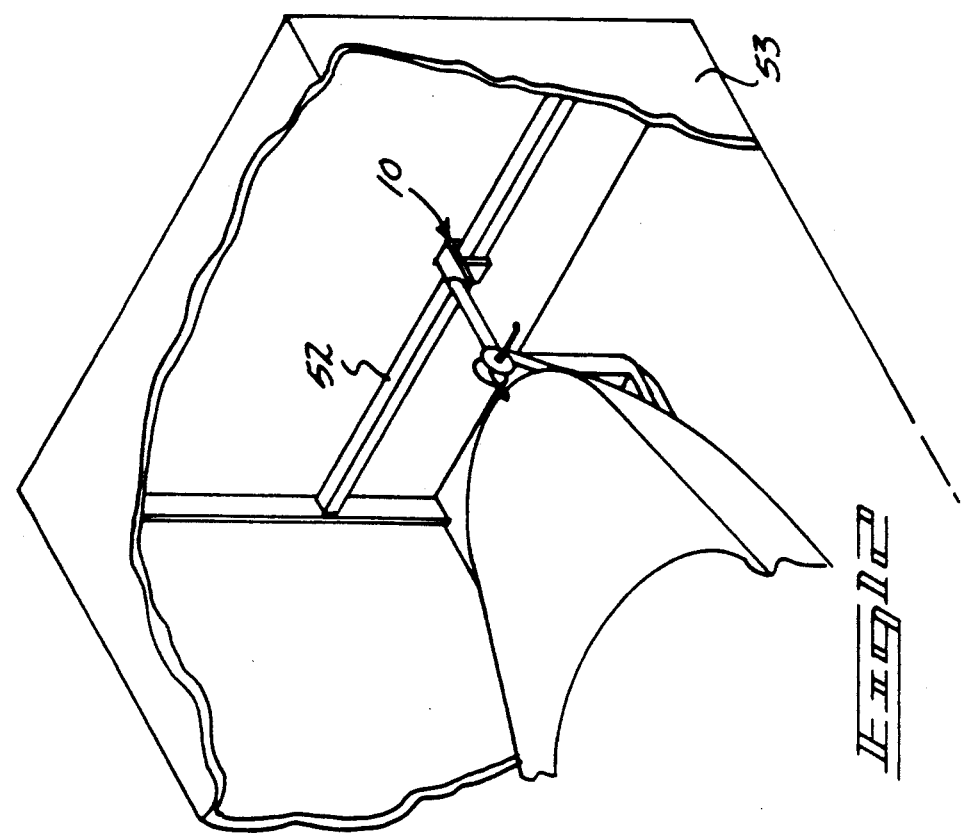
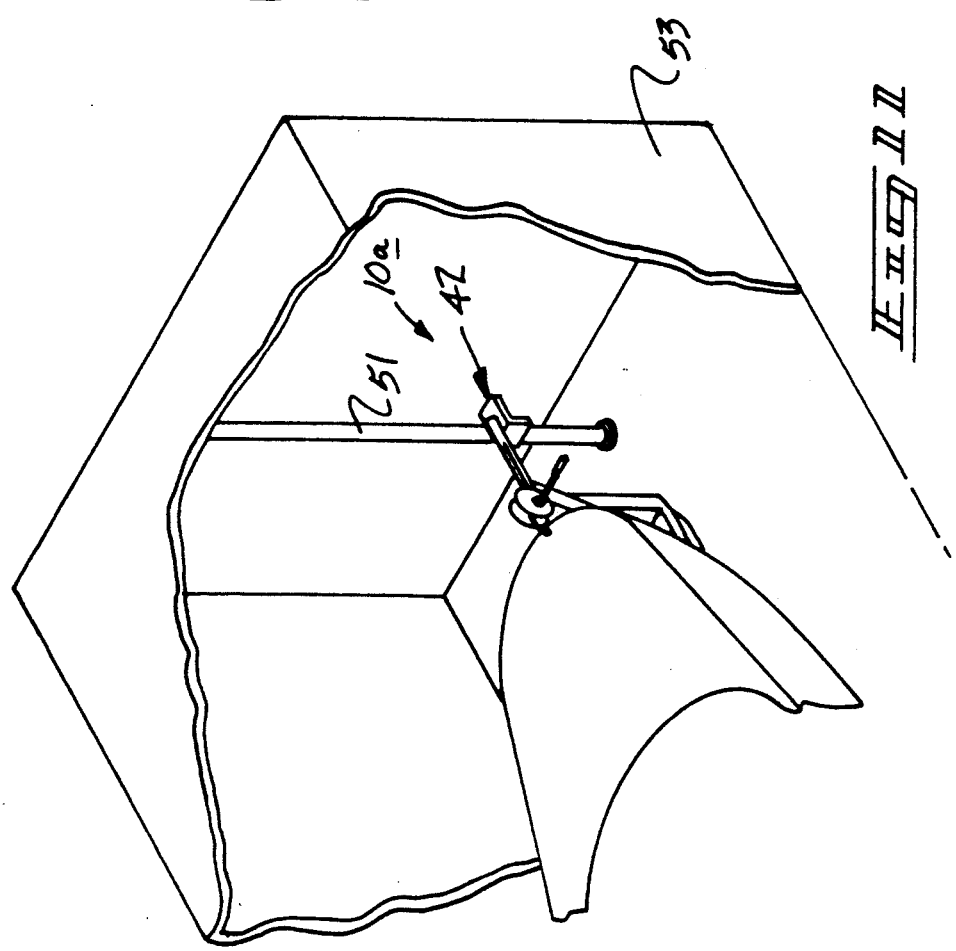

TOW HITCH APPARATUS

BACKGROUND OF THE INVENTION

1. Field of the Invention

The field of invention relates to hitch apparatus, and more particularly pertains to a new and improved tow hitch apparatus wherein the same is arranged for mounting in a stable manner a trailer organization within a transport van and the like.

2. Description of the Prior Art

Tow structure of various types are utilized throughout the prior art in securement and association of an associated trailer relative to a support framework. A trailer support structure for mounting a parked trailer is exemplified in U.S. Pat. No. 4,889,357 to Perry utilizing a socket coupling mounting the trailer structure.

U.S. Pat. No. 4,756,172 to Weaver sets forth a trailer lock to provide for an anti-theft storage and securement of a trailer relative to a fixed support.

U.S. Pat. No. 4,605,353 to Hahn sets forth mechanical restraint in securing a parked trailer to a stationary structure providing a locking structure mounting the trailer to the structure.

U.S. Pat. No. 3,857,575 to Lee sets forth a security trailer hitching post, wherein the hitching post is telescopingly mounted within an underlying ground support and directed therefrom for securement to an associated trailer structure.

As such, it may be appreciated that there continues to be a need for a new and improved tow hitch apparatus as set forth by the instant invention which addresses both the problems of ease of use as well as effectiveness in construction and in this respect, the present invention substantially fulfills this need.

SUMMARY OF THE INVENTION

In view of the foregoing disadvantages inherent in the known types of trailer hitch apparatus now present in the prior art, the present invention provides a tow hitch apparatus wherein the same is arranged for mounting a trailer in a stable and secure relationship relative to a transport vehicle and the like during storage or transport of the trailer structure. As such, the general purpose of the present invention, which will be described subsequently in greater detail, is to provide a new and improved tow hitch apparatus which has all the advantages of the prior art trailer hitch apparatus and none of the disadvantages.

To attain this, the present invention provides a hitch structure arranged for securement in a stable relationship of a trailer in mounting the trailer and associated cargo to a horizontal support post to impart stability to the trailer organization during transport thereof.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved tow hitch apparatus which has all the advantages of the prior art trailer hitch apparatus and none of the disadvantages.

It is another object of the present invention to provide a new and improved tow hitch apparatus which may be easily and efficiently manufactured and marketed.

It is a further object of the present invention to provide a new and improved tow hitch apparatus which is of a durable and reliable construction.

An even further object of the present invention is to provide a new and improved tow hitch apparatus which is susceptible of a low cost of manufacture with regard to both materials and labor, and which accordingly is then susceptible of low prices of sale to the consuming public, thereby making such tow hitch apparatus economically available to the buying public.

Still yet another object of the present invention is to provide a new and improved tow hitch apparatus which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an isometric illustration of the instant invention.

FIG. 2 is a frontal view of the instant invention.

FIG. 3 is an orthographic side view of the invention.

FIG. 4 is an isometric illustration of a modification of the invention.

FIG. 5 is an orthographic view, taken along the lines 5—5 of FIG. 4 in the direction indicated by the arrows.

FIG. 10 is an isometric illustration of the bracket structure secured to the modified towage bracket structure.

FIG. 11 is an isometric illustration of the adapter bracket structure utilized to permit mounting of the trailer to a vertical support post.

FIG. 12 is an isometric illustration setting forth the invention mounted to a horizontal support post, with an associated transport van.

DESCRIPTION OF THE PREFERRED EMBODIMENT

Figure 6:
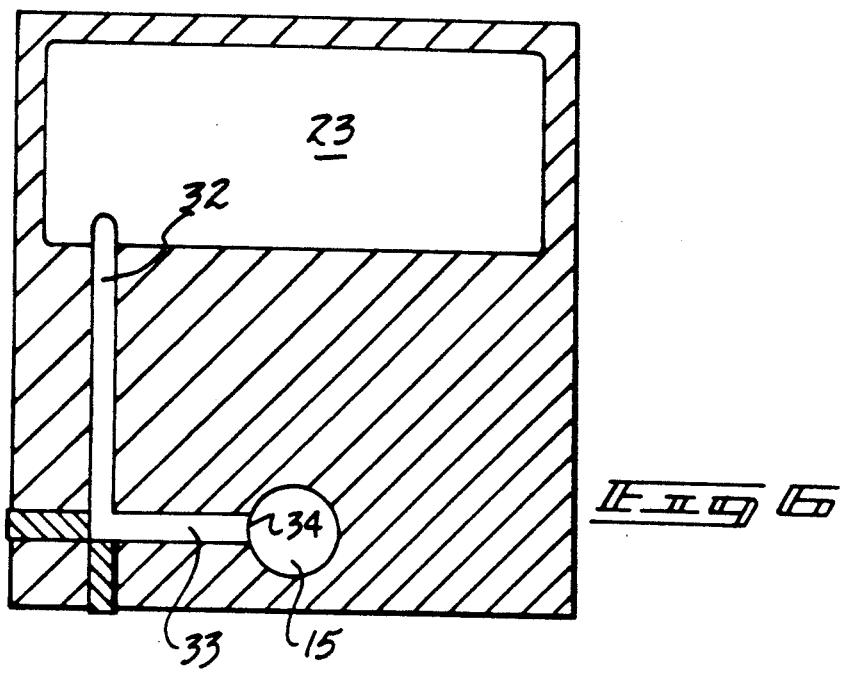
FIG. 6 is an orthographic view, taken along the lines 6—6 of FIG. 4 in the direction indicated by the arrows.
Figure 7:
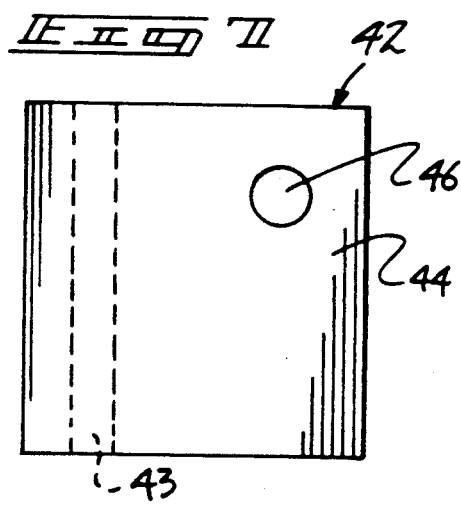
FIG. 7 is an orthographic top view of a "T" shaped adapter bracket utilized by the invention.
Figure 8:
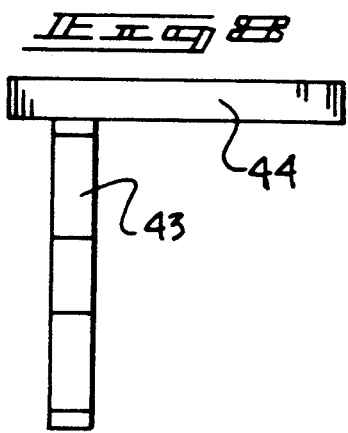
FIG. 8 is an orthographic side view of the bracket, as set forth in FIG. 7.
Figure 9:
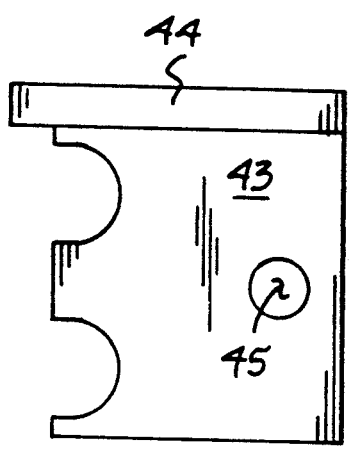
FIG. 9 is an orthographic front view of the bracket structure, as set forth in FIG. 7.

With reference now to the drawings, and in particular to FIGS. 1 to 12 thereof, a new and improved tow hitch apparatus embodying the principles and concepts of the present invention and generally designated by the reference numerals 10 and 10a will be described.

More specifically, the tow hitch apparatus 10 of the instant invention essentially comprises a first plate 11 spaced from and parallel to a second plate 12 in a coextensive relationship relative to one another, with a top plate 13 fixedly and orthogonally mounted to an upper terminal end of each of the first and second plates 11 and 12 to include a top plate projecting flange 14 projecting beyond the first plate 11 to receive a threaded stud 16 through a flange opening 15. The threaded stud 16 has fixedly mounted at an upper terminal end thereof a mounting sphere 18, with a fastener 17 securable to a lower portion of the threaded stud to secure the top plate projecting flange 14 between the mounting sphere and the fastener 17. In this manner, a plurality of lock bolts 19 are directed orthogonally through the first plate 11 and threadedly received within the second plate 12 to arrange in a parallel relationship the lock bolts 19. The lock bolts 19 are directed into the second plate internally threaded bores 20 and define a channel within the thusly defined framework to receive and secure a mounting post 52, in a manner as illustrated in FIG. 12. In this manner, a transport van and the like 53 secures the associated trailer for transport of the organization in use.

FIGS. 4–11 illustrate a modified apparatus 10a to include a modified top plate 21, including a projecting plate flange 22 directed beyond the first plate 11 in the orthogonal relationship as discussed above. The top plate 21 includes a reservoir 23 positioned between the first and second plates 12 and above such plates to include a transparent sight glass 24 to permit viewing into the reservoir 23 to provide visual indication of fluid remaining therewithin. Such fluid is typically in the form of a lubricating grease and the like. A fill plug 25 provides access into the reseroir through an associated fill bore 26. A threaded rod 27 extends longitudinally of the reservoir 23 to include a rotating handle 28 positioned fixedly to a distal terminal end of the threaded rod 27 positioned exteriorly of the reservoir and the top plate 21. An interior end portion of the threaded rod 27 is rotatably secured within a mounting bearing 31 to permit rotation of the threaded rod within the reservoir. A piston 29 including internally threaded bores are threadedly mounted to the threaded rod. The piston is formed of a non-cylindrical configuration or provided with a guide groove to be directed over the guide rod to stationarily align the piston 29 relative to the reservoir 23. In this manner, upon rotation of the threaded rod 27, the piston 30 and a sealing ring 29 positioned thereabout effects projection of the piston along the threaded rod to pressurize fluid within the reservoir 23. As noted in FIG. 5, the guide rod 30a is directed in this example through the piston 30 to maintain its alignment within the reservoir 23 in use.

Upon pressurizing of fluid within the reservoir 23 (see FIG. 6), the lubricating fluid is directed through a first feed conduit 32 within the top plate 21 and subsequently into a second feed conduit 33. The second feed conduit 33 terminates in an outlet opening 34 within the flange opening 15. Reference to FIG. 4 illustrates that the threaded stud 16 includes a circumferential groove 35 at an upper terminal end thereof positioned within the flange opening 15 and secured therewithin by the fastener 17 and a mounting sphere top flange 40a within the circumferential groove 35. A plurality of mounting sphere first feed conduit entrance openings 36 directed into a first mounting sphere 37 that in turn feeds into a second mounting sphere conduit 38 directing fluid into the mounting sphere 40. The mounting sphere 40 includes a plurality of third mounting sphere feed conduits 41 projecting the lubricating fluid into mounting sphere outlet ports 39 to thereby direct a lubricating grease or fluid into an exterior surface of the mounting sphere to thereby minimize corrosive adhesion between the mounting sphere and an associated trailer socket arrangement and permit ease of their relative rotation and securement, as well as providing ease of assembly and disassembly of the structure in subsequent use.

FIG. 10 further illustrates the use of the adapter "T" bracket structure 42 utilized by the invention to include a "T" bracket first plate 43 orthogonally mounted to a "T" bracket second plate 44. A first plate bore 45 is directed through the first plate, with a second plate bore 46 directed through the second plate interconnected by a "T" bracket feed conduit 47. A "T" bracket fastener bolt 48 includes first bores 49 in alignment with the second feed conduit outlet port 34 of the modified top plate 21, with the fastener first bores 49 in fluid communication with fastener second bores 50 by means of a fastener conduit 49a. The fastener second bores 50 thereby direct lubricating fluid from the outlet opening 34, in a manner as described above, through the first bores 49 into the second bores 50 to project a lubricating fluid from the first plate bore 45 into the second plate bore 46, whereupon the mounting sphere first feed conduit entrance openings 36 direct the lubricating fluid into the mounting sphere outlet ports 39, in a manner as discussed above, for lubrication of a socket connection. As illustrated in FIG. 11 for example, this permits mounting of the apparatus 10a to a vertical mounting post 51 between the first and second plates 11 and 12 and directing the lubricating conduit through the adapter "T" bracket 42 to an associated socket, as illustrated in FIG. 11, for transport of the trailer structure within the transport van 53.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A tow hitch apparatus, comprising, a first plate spaced from and parallel to a second plate, and a top plate fixedly and orthogonally mounted to the first plate and the second plate, with the top plate including a projecting flange extending orthogonally beyond the first plate, and the top plate including a flange opening, the flange opening including a mounting sphere means mounted thereon for receiving a trailer tongue thereon, and at least one lock bolt orthogonally directed through the first plate, and the second plate including an internally threaded bore threadedly receiving the lock bolt to permit securement of a support post between the first plate, second plate, top plate, and lock bolt, and the top plate includes a fluid reservoir, the fluid reservoir including a transparent sight glass to permit visual observation of fluid contained within the reservoir, and a fill plug directed through the top plate into the fluid reservoir received within a fill bore permitting selective filling of the reservoir, and a threaded rod threadedly directed coaxially of the reservoir, with the threaded rod including a first end rotatably mounted within the top plate and a second end extending exteriorly of the top plate, including a handle mounted fixedly thereto, and a piston including an internally threaded coaxial bore threadedly mounted to the threaded rod, and a seal ring circumferentially mounted to the piston, and a guide rod directed through the piston and positioned fixedly within the reservoir to align the piston within the reservoir, whereupon rotation of the handle effects compression of fluid contained within the reservoir, and a first feed conduit in fluid communication with the reservoir, and a second feed conduit in fluid communication with the first feed conduit, with the second feed conduit including a second feed conduit outlet opening in communication with the flange opening to provide directing of lubricant into the flange opening.

2. An apparatus as set forth in claim 1 wherein the mounting sphere means includes a threaded stud directed through the flange opening, and the threaded stud including a circumferential groove positioned within the flange opening, with the circumferential groove including at least one mounting sphere first feed conduit entrance opening, the mounting sphere first feed conduit entrance opening directed into a first conduit within the mounting sphere means, and the mounting sphere means including a mounting sphere fixedly mounted to an upper terminal end of the threaded stud above the circumferential groove, and a second mounting sphere conduit in fluid communication with the first mounting sphere conduit directed into the mounting sphere, with the mounting sphere including a plurality of third mounting sphere feed conduits in fluid communication with the second mounting sphere conduit, and the third mounting sphere conduits including mounting sphere outlet ports positioned about an outer surface of the mounting sphere to direct the lubricating fluid to the outer surface of the mounting sphere for lubrication of a trailer socket connection.

3. An apparatus as set forth in claim 2 including an adapter "T" bracket, with the adapter "T" bracket including a "T" bracket first plate fixedly and orthogonally mounted to a "T" bracket second plate, the "T" bracket first plate includes a "T" bracket first plate bore, and the "T" bracket second plate includes a "T" bracket second plate bore, wherein the first plate bore and the second plate bore are in fluid communication relative to one another by means of a "T" bracket feed conduit, and the first plate bore aligned with the flange opening, and a "T" bracket fastener bolt directed through the first plate bore and the flange opening, including feed means for directing the lubricating fluid from the flange opening to the second plate bore through the "T" bracket feed conduit.

4. An apparatus as set forth in claim 3 wherein the feed means includes a "T" bracket fastener bolt directed through the flange opening and the first plate bore, wherein the fastener bolt includes fastener bolt first bores aligned with the flange opening, and second bores aligned with the second plate bore, and the fastener first bores and the fastener second bores including a fastener conduit in fluid communication between the first bores and the second bores.

* * * * *